(12) United States Patent
Kim et al.

(10) Patent No.: US 10,880,899 B2
(45) Date of Patent: Dec. 29, 2020

(54) METHOD AND APPARATUS FOR SELECTING UNMANNED AERIAL VEHICLE CONTROL AND NON-PAYLOAD COMMUNICATION CHANNEL ON BASIS OF CHANNEL INTERFERENCE ANALYSIS

(71) Applicant: Electronics and Telecommunications Research Institute, Daejeon (KR)

(72) Inventors: Hee Wook Kim, Daejeon (KR); Kwang Jae Lim, Daejeon (KR)

(73) Assignee: Electronics and Telecommunications Research institute, Daejeon (KR)

( * ) Notice: Subject to any disclaimer, the term of this patent is extended or adjusted under 35 U.S.C. 154(b) by 100 days.

(21) Appl. No.: 16/248,521

(22) Filed: Jan. 15, 2019

(65) Prior Publication Data
US 2019/0230671 A1    Jul. 25, 2019

(30) Foreign Application Priority Data
Jan. 23, 2018 (KR) .................. 10-2018-0008152

(51) Int. Cl.
*H04W 72/08* (2009.01)
*H04B 7/185* (2006.01)
(Continued)

(52) U.S. Cl.
CPC ...... *H04W 72/082* (2013.01); *H04B 7/18506* (2013.01); *H04B 17/336* (2015.01); *H04B 17/345* (2015.01); *H04W 74/00* (2013.01)

(58) Field of Classification Search
None
See application file for complete search history.

(56) References Cited

U.S. PATENT DOCUMENTS

| 2017/0142766 A1 | 5/2017 | Kim |
| 2017/0215178 A1* | 7/2017 | Kim .................. H04W 72/048 |

(Continued)

FOREIGN PATENT DOCUMENTS

| KR | 1020150117879 A | 10/2015 |
| KR | 1020160104892 A | 9/2016 |
| KR | 102017089582 A | 8/2017 |

OTHER PUBLICATIONS

Jim Griner, "Unmanned Aircraft Systems (UAS) Integration in the National Airspace System (NAS) Project", Apr. 22, 2015, pp. 1-21, I-CNS Plenary, NASA Glenn Research Center, Herdon, VA, USA.

*Primary Examiner* — Kodzovi Acolatse
*Assistant Examiner* — The Hy Nguyen
(74) *Attorney, Agent, or Firm* — William Park & Associates Ltd.

(57) ABSTRACT

Disclosed is a method and apparatus for selecting a channel for UAV control and non-payload communication on the basis of a channel interference analysis. According to an embodiment of the present disclosure, provided is a method of selecting a UAV control channel on the basis of an interference analysis, the method including: performing, by a user device, the interference analysis; selecting, by the user device, a channel on the basis of a result of the interference analysis; requesting, by the user device, a central management device to approve the selected channel; and performing, by the user device, communication with a UAV on the channel approved by the central management device.

19 Claims, 7 Drawing Sheets

(51) Int. Cl.
*H04B 17/345* (2015.01)
*H04B 17/336* (2015.01)
*H04W 74/00* (2009.01)

(56) References Cited

U.S. PATENT DOCUMENTS

2017/0215220 A1   7/2017  Kim et al.
2017/0295586 A1* 10/2017  Wang ................ H04W 72/0493
2018/0160433 A1*  6/2018  Kim ................... H04B 7/18504

* cited by examiner

METHOD AND APPARATUS FOR SELECTING UNMANNED AERIAL VEHICLE CONTROL AND NON-PAYLOAD COMMUNICATION CHANNEL ON BASIS OF CHANNEL INTERFERENCE ANALYSIS

CROSS REFERENCE TO RELATED APPLICATION

The present application claims priority to Korean Patent Application No. 10-2018-0008152, filed Jan. 23, 2018, the entire contents of which is incorporated herein for all purposes by this reference.

BACKGROUND OF THE INVENTION

Field of the Invention

The present disclosure relates generally to unmanned aerial vehicle (UAV) communications. More particularly, the present disclosure relates to a method and apparatus for selecting a channel for UAV control and non-payload communication on the basis of a channel interference analysis.

DESCRIPTION OF THE RELATED ART

Channels for control and non-payload communication (CNPC) are defined for unmanned aerial vehicle (UAV) communications.

Conventional UAV CNPC channels are fixedly assigned only to CNPC systems in the type of conventional point-to-point (peer-to-peer, P2P) for a long time (for example, one or more years). That is, once a channel is assigned to a particular UAV CNPC system, it is difficult to use the channel in other UAV CNPC systems. Accordingly, under consideration that frequency resources for CNPC are limited, there is a problem that the number of communication channels capable of coping with a UAV CNPC system is limited.

Also, in the case of a system in the type of point-to-multipoint (P2MP) using time-division multiple access (TDMA) technology in an uplink and using frequency division multiple access (FDMA) technology in a downlink, a single ground radio station (GRS) forms CNPC links with several UAVs at the same single uplink frequency, so that it is difficult to apply the conventional method intactly that a frequency channel is assigned for each P2P-type CNPC system.

In order to solve these problems, required is technology for efficiently using UAV CNPC frequency resources capable of efficiently operating multiple UAVs in limited UAV CNPC frequency bands for stable operation of the UAV and an increase in demand for UAVs.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a method and apparatus for dynamically assigning a frequency and managing the frequency in real time with respect to a UAV CNPC channel and a video channel.

Also, the present disclosure is intended to propose a method and apparatus for assigning a frequency when a UAV is in operation and returning the frequency after operation is completed with respect to a UAV CNPC channel and a video channel so as to reuse the channel frequency for other UAV communications.

Also, the present disclosure is intended to propose a method and apparatus for increasing usage of the UAV CNPC channel and the video channel in a system that supports multiple UAVs simultaneously.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of selecting a UAV control channel on the basis of an interference analysis, the method including: performing, by a user device, the interference analysis; selecting, by the user device, a channel on the basis of a result of the interference analysis; requesting, by the user device, a central management device to approve the selected channel; and performing, by the user device, communication with a UAV on the channel approved by the central management device.

According to another aspect of the present disclosure, there is provided a method of assigning an UAV control channel on the basis of an interference analysis, the method including: receiving, from a user device by a central management device, a request for approval with respect to a channel selected by the user device on the basis of an interference analysis; analyzing, by the central management device, an interference effect on an existing communication channel with respect to the channel requested for approval; and assigning, by the central management device, the channel requested for approval to the user device when a result of the analyzing of the interference effect is valid and notifying the user device that the channel requested for approval is impossible to be assigned when the result of the analyzing of the interference effect is invalid.

It is to be understood that the foregoing summarized features are exemplary aspects of the following detailed description of the present disclosure without limiting the scope of the present disclosure.

According to the present disclosure, the method and apparatus for dynamically assigning the frequency and managing the frequency in real time with respect to the UAV CNPC channel and the video channel may be provided.

According to the present disclosure, the method and apparatus for assigning the frequency when the UAV is in operation and returning the frequency after operation is completed with respect to the UAV CNPC channel and the video channel so as to reuse the channel frequency for other UAV communications may be provided.

According to the present disclosure, the method and apparatus for increasing usage of the UAV CNPC channel and the video channel in the system that supports multiple UAVs simultaneously may be provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION OF THE INVENTION

Figure 1:
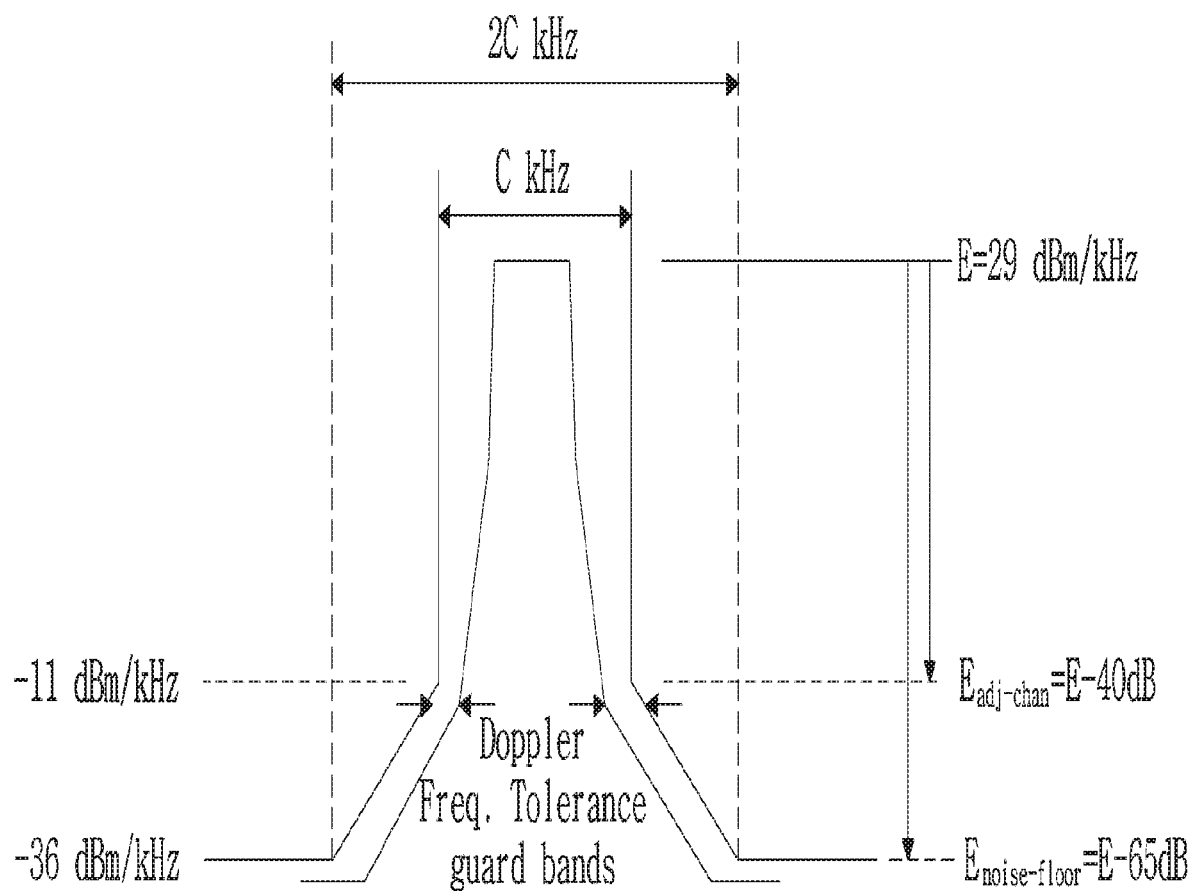
FIG. 1 is a diagram illustrating an example of a channel spectrum for an interference analysis and channel selection according to the present disclosure.

Hereinafter, exemplary embodiments of the present disclosure will be described in detail with reference to the accompanying drawings such that the disclosure can be easily embodied by one of ordinary skill in the art to which this disclosure belongs. However, the present disclosure may be embodied in various different forms and should not be limited to the embodiments set forth herein.

In describing embodiments of the present disclosure, it is noted that when the detailed description of known configurations or functions related to the present disclosure may make the gist of the present disclosure unclear, the detailed description of thereof will be omitted. Also, portions that are not related to the present disclosure are omitted in the drawings, and like reference numerals designate like elements.

In the present disclosure, when an element is "coupled to", "combined with", or "connected to" another element, it can be directly coupled to the other element or intervening elements may be present therebetween. Also, when a constituent "comprises" or "includes" an element, unless there is another opposite description thereto, the constituent does not exclude other elements but may further include the elements.

In the present disclosure, the terms "first", "second", etc. are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

In the present disclosure, constituents that are distinguished from each other to clearly describe each feature do not necessarily denote that the constituents are separated. That is, a plurality of constituents may be integrated into one hardware or software unit, or one constituent may be distributed into a plurality of hardware or software units. Accordingly, even if not mentioned, the integrated or distributed embodiments are included in the scope of the present disclosure.

In the present disclosure, constituents described in various embodiments do not denote essential constituents, and some of the constituents may be optional. Accordingly, an embodiment that includes a subset of constituents described in another embodiment is included in the scope of the present disclosure. Also, an embodiment that includes the constituents which are described in the various embodiments and additional other constituents is included in the scope of the present disclosure.

The present disclosure relates to an interference analysis between channels and a channel selection method to dynamically assign a CNPC channel and a video channel of P2P-type and P2MP-type UAV CNPC systems in order to efficiently use and manage the limited spectrum for controlling an unmanned aerial vehicle (UAV) in national airspace.

More specifically, the present disclosure relates to a dynamic interference analysis and channel selection method with respect to CNPC and video channels of P2P-type and P2MP-type UAV CNPC systems for dynamically assigning and returning communication channels through communication channel management of a spectrum authority only when system operation is requested, without fixedly assigning the communication channels to the UAV CNPC system.

In the present disclosure, all elements required in the entire flight process, including the UAV and a communication system for controlling take-off/cruise, flight, landing/return, and the like, are inclusively referred to as an unmanned aircraft system (UAS) or a remotely piloted aircraft system (RPAS).

The UAS may include an UAV ground control station, an UAV, and a data link. The data link is a radio data link between a ground radio station (GRS) and the UAV. The data link for the UAS may be classified into a UAS ground control and non-payload communication (CNPC) data link and a UAS payload link.

A payload data link is a link used to transmit data related to payload and is generally broader than the CNPC data link. In contrast, a CNPC link is a link used to transmit data related to UAV flight control, UAS state monitoring, and CNPC link management and may be divided into a pilot/air traffic control (ATC) center relay link and a UAS control link.

The pilot/ATC center relay link is a communication link for relaying voice and data between the ATC center and the pilot via the UAV. The UAS control link is a link used to transmit control information related to safe flight between the pilot and the UAV.

The UAS control link may be classified into a telecommand (TC) line and a telemetry (TM) link. The TC link is a link through which flight orbit control information, any type of UAV system control information required for safe flight, and the like are transmitted from the pilot on the ground to the UAV. The TM link is a downlink through which a location, altitude, speed of the UAV, an operation mode and state of the UAS, navigation aid data, detection and avoidance-related tracking, weather radar, and image information are transmitted from the UAV to the pilot on the ground.

In general, a C band (5030 to 5091 MHz), which is allocated as a new dedicated band in World Radiocommunication Conference (WRC)-12, is considered as a frequency for a UAV ground CNPC link. Furthermore, a band, such as an L band (960 to 1164 MHz) allocated for an aeronautical mobile service may be considered, wherein the L band has standards to be used for the aeronautical mobile service in WRC-12.

In the case of the C band, frequency interference influence from an existing system and multipath delay spread are small, but the use of a directional antenna needs to be considered to ensure the link margin and the Doppler effect is five times larger than for the L band. On the contrary, in the case of a low frequency band, such as the L band, allocated for another aeronautical mobile service, the propagation characteristics are better than that of the C band (the L band has the propagation loss lower by about 14 dB than the C band), but existing aeronautic systems, such as distance measurement equipment (DME), an automatic dependent surveillance-broadcast (ADS-B) system, a tactical air navigation system (TACAN), and the like, operate in a congested manner resulting in difficulty in securing the frequency and the multipath delay spread is large.

Therefore, usually, the pre-secured C band may be considered as a basic band of the ground CNPC, and the low frequency band (L or UHF band, and the like) may be used to increase availability of the CNPC link for safe navigation of the UAV. Alternatively, the C band may be used to increase availability of the CNPC link for save navigation of the UAV, and the low frequency band (L or UHF band, and the like) may be used a as basic link of the ground CNPC.

Connection forms of the ground CNPC link include a P2P type and a network-based P2MP type. The P2P type is the concept that a single ground control station (GCS) forms a data link directly to the UAV, which is the type generally used in the conventional unmanned aircraft system. In contrast the network-based P2MP type is the form that ground radio stations (GRSs) are connected to a network and each control station (CS) exchanges information with the UAV via the ground network and the GRSs. In order to expand application of public and private UAVs, the P2MP type that is capable of simultaneously forming communication links with multiple UAVs and forming a nationwide network may be considered as a next generation CNPC link, but technology related to this P2MP-type UAV CNPC system is currently inadequate.

Also, for operating the conventional P2P-type UAV CNPC system, video channels for CNPC and taking off and landing or emergency are required to be assigned. However, in the conventional method, when a spectrum authority (SA) registers the UAV CNPC system, channels are fixedly assigned for a long time (for example, one or more years). Thus, once a channel is assigned to a particular UAV CNPC system, it is difficult to use the channel in other UAV CNPC systems.

Therefore, for stable operation of the UAV and an increase in demand for the UAV, required is technology for efficiently using communication frequency resources for UAV control capable of efficiently operating multiple UAVs in limited frequency bands for UAV control only.

According to the present disclosure, provided are distributed and centralized channel assignment methods that enable the SA to efficiently assign and manage the limited UAV CNPC spectrum in national airspace, and an interference analysis and a channel assignment method of dynamically assigning and changing CNPC and video channels to a next generation uplink TDMA/downlink FDMA-based P2MP-type UAV control communication system, which includes a GRS supporting multiple UAVs, as well as a conventional P2P-type by the SA on the basis of the assignment method.

That is, according to the various embodiments of the present disclosure, provided are a dynamic interference analysis and channel selection method of managing the entire frequency in real time by the spectrum authority and of dynamically assigning the frequency on when the UAV CNPC system is in operation and returning the frequency after operation is completed to reuse the frequency in other UAV CNPC systems, without fixedly assigning a particular frequency to a particular CNPC system, whereby usage of limited CNPC frequency is enhanced and a dynamic CNPC and video channel assignment method and procedure is supported in a new UAV CNPC system applicable in a future P2MP-type CNPC system simultaneously supporting multiple UAVs.

First, a CNPC channel assignment scenario taken into consideration for a channel interference analysis and channel selection for UAV CNPC will be described. Hereinafter, one of frequency bands assigned for UAV control communication internationally will be described as an embodiment, but the scope of the present disclosure is not limited thereto and may include CNPC channel assignment in a similar manner in other bands.

Table 1 shows a definition of a frequency assignment target band.

TABLE 1

C band: $5030(=f_{operating\_min})$–$5091(=f_{operating\_max})$ MHz

Table 2 shows definitions of a minimum frequency assignment unit. The minimum frequency assignment unit is called a unit channel (UC) or a basic channel (BC) and is a unit newly defined for the interference analysis and channel selection according to the present disclosure.

TABLE 2

Unit Channel (UC)

RTCA CNPC MOPS common requirements: $BW_{UC}$ = a unit of 5 kHz
P2P & P2MP Baseline Radio: $BW_{UC}$ = a unit of 30 kHz or 90 kHz Table 3 shows a definition of a UC number.

TABLE 3

BC(n): $5030(=f_{operating\_min})+BW_{UC} \times (n-1) \sim 5030(=f_{operating\_min})+BW_{UC} \times (n)$
In the case of $BW_{BC}$ = 30 kHz, 5030 to 5091 MHz are configured as BC(1) to BC(2033)
UCSet_C-band = {BC(1), BC(2), ..., BC(P-1), BC(P)} where P=2033 for $BW_{BC}$ =30 kHz Table 4 shows definitions of a center frequency and a channel bandwidth based on the UC.

TABLE 4

Channel = a set of consecutive unit channels (UCs)
CH(j) = {BC(N_start(j)), ..., BC(N_start(j)+N_BW(j)−1)}
Center frequency = {(5030+ $BW_{BC}$ ×(N_start(j)−1)+ 5030+ $BW_{BC}$ × (N_start(j)+ N_BW(j)− 1)}/2
Bandwidth = $BW_{BC}$ × (N_BW)

Table 5 shows assumptions about operation of a CNPC GRS/UA transceiver.

TABLE 5

All CNPC GRS/UA transceivers operate within a 50 ms TDD frame structure synchronized on UTC basis
The USA RTCA CNPC MOPS technical standards
No GRS-to-GRS, UA-to-UA interference due to synchronized TDD operation Table 6 shows definitions of interference analysis indexes.

TABLE 6

U/D Ratio: a ratio of an undesired signal to a desired signal
[U/D] = (EIRP_u − EIRP_d) − 20log(Du/Dd)+sqrt($Mg^2$+$Mm^2$+$Lg^2$+$Lm^2$)
EIRP_u: tansmit EIRP of undesired CNPC signal
EIRP_d: trasmit EIRP of desired CNPC signal
Du: distance between undesired Tx and desired Rx
Dd: distance between desired Tx and desired Rx
Mm: multipath enhancement exceeds 0.2% of the time
Mg: antenna gain boosting exceeds 0.2% of the time
Lm: excess multipath loss exceeds 0.2% of the time
Lg: antenna gain loss exceeds 0.2% of the time Table 7 shows definitions of U/D ratio criteria required for channel assignment.

TABLE 7

Frequency reuse tolerance U/D ratio criterion: Theta_1
- Theta_1 (dB) = Required SNR + ICAO safety margin+ Interference Margin e.g.) ETRI Baseline Radio: 3dB + 6dB + 3dB
Adjacent channel assignment tolerance U/D ratio criterion: Theta_2
- Theta_2 (dB) = Theta_1 + 40
Non-adjacent channel assignment tolerance U/D ratio criterion: Theta_2
- Theta_3 (dB) = Theta_1 + 65

FIG. 1 is a diagram illustrating an example of a channel spectrum for an interference analysis and channel selection according to the present disclosure.

In Table 7, regarding Theta_2, the rejection point lower than the peak by 40 dB at most may be assumed as a channel bandwidth by taking a Gaussian minimum shift keying (GSMK) modulation scheme into consideration as shown in FIG. 1. Also, by taking other CNPC waveforms into consideration, according to Radio Technical Commission for Aeronautics (RTCA) Minimum Operational Performance Standards (MOPS) requirements, when performing to channel assignment assuming that the point at −10 dBm/kHz is the channel bandwidth, information on that the point at −10 dBm/kHz is the rejection point how much dB spaced apart from the peak is required to be provided. On the basis of this, the Theta_2 value is determined. That is, in determining the Theta_2 value, 40 dB is an exemplary value, and is defined as Theta_2=Theta_1+X dB when using X dB as a criterion.

Similarly, regarding Theta_3 in Table 7, the point lower than the peak by 65 dB at most may be assumed as the channel bandwidth by taking the GSMK modulation scheme into consideration as shown in FIG. 1. Also, by taking other CNPC waveforms into consideration, according to the RTCA MOPS requirements, assuming that a point of −10 dBm/kHz is the channel bandwidth, when channel assignment is performed, information on that the point at −10 dBm/kHz is how lower dB than the peak is required to be provided. On the basis of this, the Theta_3 value is determined. That is, in determining the Theta_3 value, 65 dB is an exemplary value, and is defined as Theta_3==Theta_1+Y dB when using Y dB as a criterion.

Table 8 shows definitions of three types of frequency assignment intervals based on the U/D ratio between CNPC channels and transmission mask technical standards.

TABLE 8

When the U/D ratio value is equal to or smaller than Theta_1 level,
- Co-channel operation
When the U/D ratio value is equal to or larger than Theta_1 level,
- When the U/D ratio value is equal to or smaller than Theta_2 level
  - Adjacent channel operation
  - |F1−F2|=(C1+C2)/2
When the U/D ratio value is equal to or larger than Theta_1 level,
- When the U/D ratio value is equal to or larger than Theta_2 level
  - Non-adjacent channel operation
  - |F1−F2|=MAX [(C1+C2/2), (C3/2+C4)]

On the basis of definitions and assumption about terms and parameters related to a channel analysis and channel selection for UAV communication as described above, a method of performing the interference analysis and channel selection for UAV CNPC dynamic channel assignment according to the present disclosure will be described below.

Regarding the method of performing the interference analysis and channel selection for UAV CNPC dynamic channel assignment according to the present disclosure, some methods may be applied differently according to distributed UAV CNPC channel dynamic assignment and centralized UAV CNPC channel assignment. First, in the distributed channel assignment method, a method of performing the interference analysis and selecting the channel by the GCS will be described.

Figure 2:
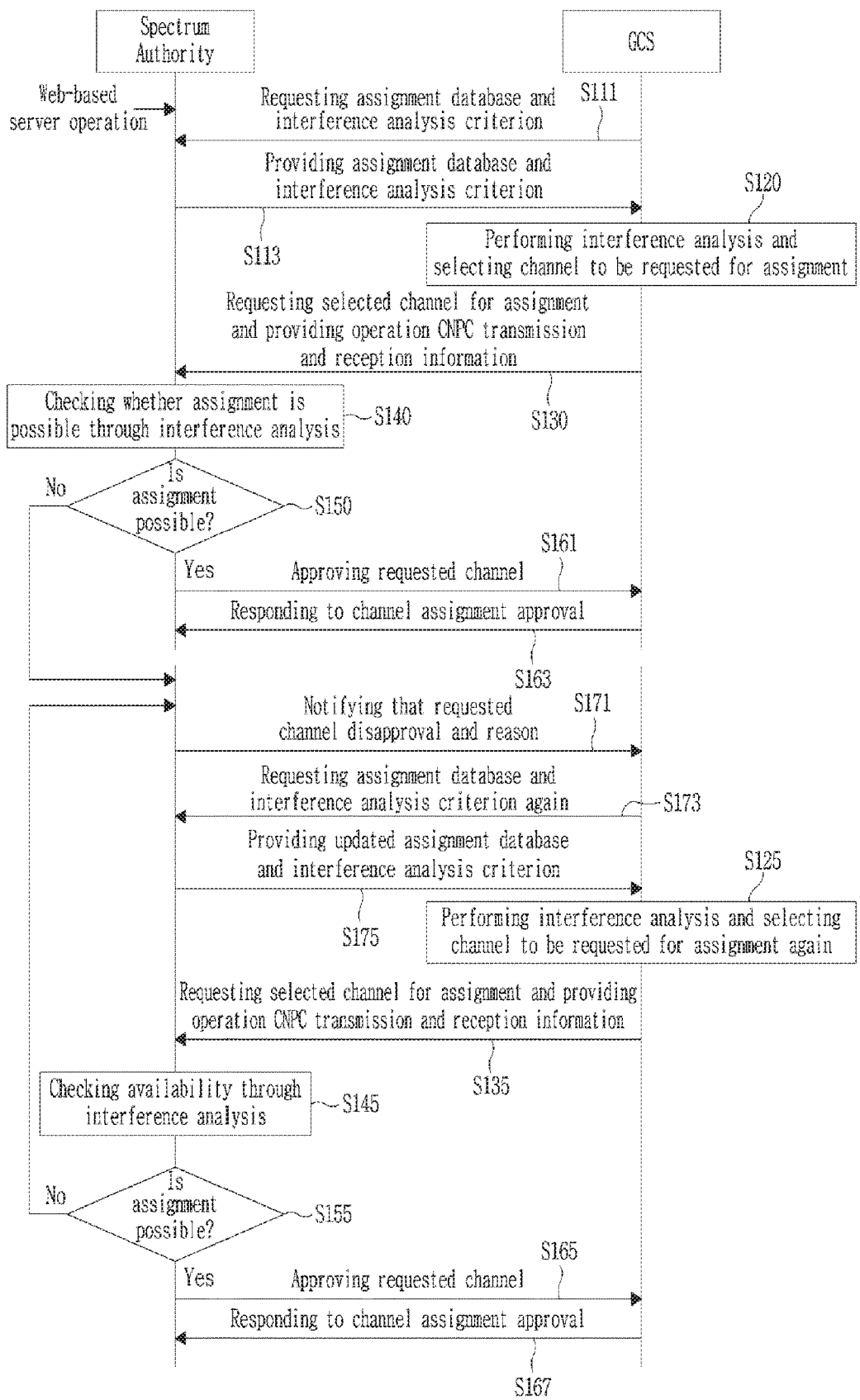
FIG. 2 is a diagram illustrating a process of distributed CNPC channel assignment according to the present disclosure.

FIG. 2 is a diagram illustrating a process of distributed CNPC channel assignment according to the present disclosure.

In the distributed CNPC channel assignment method for the CNPC system, on the basis of information received from each SA, each GCS (or a pilot, an operator, a service provider) analyzes an available CNPC channel by taking a flight plan, CNPC operating environment, and the like into consideration, and then makes a request to the SA for one channel of the analyzed available channel set. The SA checks whether the CNPC channels required by respective GCSs are safely usable in the airspace and determines whether to approve the required channel.

Also, the priority among GCSs that desire to use the CNPC channel is based on the first-come first-served (FCFS) scheme.

In the distributed CNPC channel assignment method, the spectrum authority operates a web-based channel assignment server. When the spectrum authority receives a request for an assignment database and an interference analysis criterion from the GCS at step S111, the spectrum authority provides the assignment database and the interference analysis criterion to the GCS via the channel assignment server at step S113. The assignment database may include information on center frequency and bandwidth, the maximum transmit power, reception sensitivity, GRS location and communication coverage, and antenna gain with respect to a pre-assigned CNPC channel for performing the interference analysis and selecting an assignment request channel by the GCS.

The provided interference analysis criterion is an interference analysis criterion being applied for the SA to approve the channel required by the GCS. The GCS may perform the interference analysis on the basis of the assignment database and the interference analysis criterion provided from the channel assignment server, and may autonomously select the CNPC channel to be requested to the SA for assignment at step S120.

The GCS may make a request to the SA for the selected channel, and the GCS may provide transmission and reception information on the CNPC system to be operated through the selected channel at step S130.

The SA may analyze an interference effect on the existing operated CNPC channel on the basis of CNPC transmission and reception specification information provided with respect to the channel requested by the GCS at step S140. On the basis of the interference analysis, when determining that the channel requested by the GCS satisfies the interference criterion (the result at step S150 is "Y"), the SA approves the channel requested by the GCS at step S161 and receives a response to channel assignment approval from the GCS at step S163.

When the channel requested by the GCS overlaps with another channel or when GCS does not satisfy the interference analysis criterion due to another CNPC channel assigned between the interference analysis periods by the SA (the result at step S150 is "N"), the SA notifies the (CS of requested channel disapproval and the reason at step S171. The GCS notified of disapproval may make a request to the channel assignment server for the assignment database and the interference analysis criterion again at step S173. In response thereto, the GCS may receive the updated assignment database and the interference analysis criterion from the channel assignment server at step S175.

The GCS may perform the interference analysis on the basis of the updated assignment database and the interference analysis criterion provided from the channel assignment server, and may autonomously reselect the CNPC channel to be requested to the SA for assignment at step S125.

The GCS may make a request to the SA for the reselected channel, and the GCS may provide transmission and reception information on the CNPC system to be operated through the reselected channel at step S135.

The SA may analyze the interference effect on the existing operated CNPC channel on the basis of CNPC transmission and reception specification information provided with respect to the channel requested by the GCS (namely, the reselected channel) at step S145. On the basis of the interference analysis, when determining that the channel requested by the GCS satisfies the interference criterion (the result at step S155 is "Y"), the SA approves the channel requested by the GCS at step S165 and receives a response to channel assignment approval from the GCS at step S167.

When the channel requested by the GCS (namely, the reselected channel) overlaps with another channel or the GCS does not satisfy the interference analysis criterion due to another CNPC channel assigned between the interference analysis periods by the SA (the result at step S155 is "N"), the SA notifies the GCS of requested channel disapproval and the reason at step S171. The subsequent process is repetition of the above-described operation, so that redundant description thereof is omitted.

The maximum number of channel sets that the UAV simultaneously possess may be limited to two or three, so that the GCS returns the existing CNPC channel and requests new CNPC channel assignment when a new channel is required.

Figure 3:
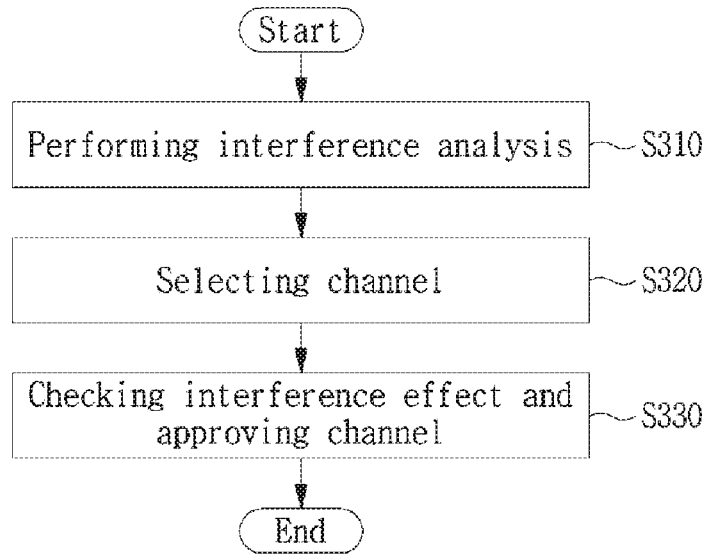
FIG. 3 is a diagram illustrating the overall flow of performing an interference analysis and channel selection according to the present disclosure.

FIG. 3 is a diagram illustrating the overall flow of performing an interference analysis and channel selection according to the present disclosure.

In the distributed channel assignment procedure of the present disclosure, the method of performing the interference analysis and channel selection is the method of performing the interference analysis and channel selection by the GCS, and may include: performing the interference analysis by the GCS at step S310; performing the channel selection by the GCS at step S320; and checking the interference effect and approving the channel by the SA at step S330.

Particularly, according to the present disclosure, at the performing of the interference analysis by each GCS at step S310, the interference analysis is performed on the basis of parameters defined in the present disclosure, whereby high reliability of UAV communication is ensured.

Also, according to the present disclosure, at the selecting of the channel by each GCS at step S320, defined is a new operation of selecting the channel on the basis of channel categories and a guard band setting.

Also, at the performing of the interference analysis at step S310 and channel selection at step S320 on the user side (for example, the GCS) according to the present disclosure, the channel is dynamically selected on the basis of the interference analysis on the user side, and the channel selected by the user is not overridden and only whether to approve the selected channel is determined on the central manager (for example, the SA) side. Accordingly, the processing overhead on the central manager side may be reduced, and sensitive information on the user side may not be provided to the central manager side, thereby enhancing security.

Specifically, the performing of the interference analysis by the GCS at step S310 may include detailed operations of five steps, the performing of the channel selection by the GCS at step S320 may include detailed operations of 12 steps, and the checking of the interference effect and the approving the channel by the SA at step S330 may include detailed operations of two steps. However, the scope of the present disclosure is not limited to the examples, and some steps are merged, subdivided, or omitted according to an implementation situation.

Figure 4:
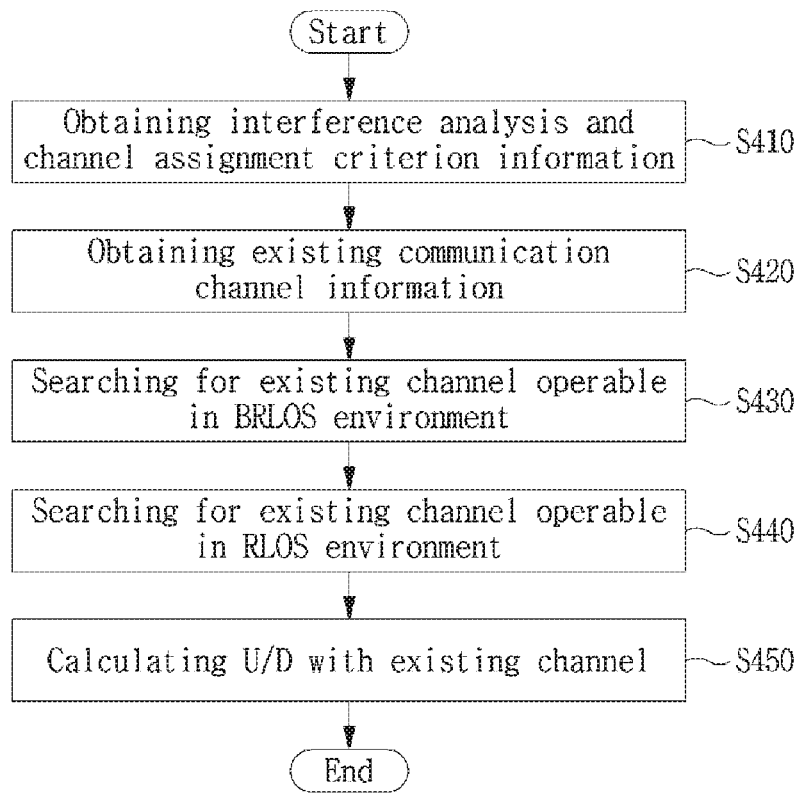
FIG. 4 is a diagram illustrating detailed operations of a process of performing an interference analysis according to the present disclosure.

FIG. 4 is a diagram illustrating detailed operations of a process of performing an interference analysis according to the present disclosure.

The operations of five steps shown in FIG. 4 may be included in the detailed operations of the performing of the interference analysis at step S310 shown in FIG. 3.

At step S410, the GCS may obtain parameter information and channel assignment criterion information required for the interference analysis from the assignment database provided from the SA.

Examples of parameters required for interference are shown in Table 9 below. Examples shown in Table 9 correspond to the parameters for ensuring high reliability of UAV communication. For example, a margin may be considered as a margin value to prevent the worst case in UAV communication in which instant control is important. That is, various margin values are receivable in practice even though the signal intensity is only x dB, but may be defined as margin values to cope with error situations (namely, to prevent the worst case).

TABLE 9

Parameter information required in the interference analysis

M_Multipath_boosting: a margin for multipath enhancement of an undesired signal
- The USA RTCA CNPC MOPS standards: Applying 3 dB M_AntGain_boosting: a margin for antenna gain boosting of an undesired signal
- The USA RTCA CNPC MOPS standards: Applying 6 dB M_Excess_pathloss: a margin for excess multipath loss of a desired signal
- The USA RTCA CNPC MOPS standards: Applying 20 dB M_Airframe_shadowing: a margin for airframe shadowing gain of a desired signal
- The USA RTCA CNPC MOPS standards: Applying 12 dB M_ICAO_safety: an International Civil Aviation Organization (ICAO) safety margin for aeronautical Comm.
- The USA RTCA CNPC MOPS standards: Applying 6 dB M_Interference: an interference margin
- The USA RTCA CNPC MOPS standards: Applying 3 dB Next, the examples of channel assignment criterion information are shown in Table 10 below. The examples shown in Table 10 may be taken into consideration as basic information related to the characteristics of the present disclosure on categories of channel selection.

TABLE 10

Channel assignment criterion information

Theta_1(n): frequency reusable U/D tolerance level such as CNPC channel n
- Theta_1(n) = Required_SINR(n) + Interference Margin + ICAO Safety Margin
    - Required_SNR(n): the n-th CNPC channel request reception signal-to-interference-plus-noise-ratio (SINR)
    - RTCA CNPC MOPS standards Annex: considering Baseline Radio and considering request reception SINR value of Baseline Radio regardless of n
        - Theta_1 = 3.5 dB + 3 dB + 6 dB = 12.5 dB Theta_2(n, k): CNPC channel k available U/D tolerance level adjacent to CNPC channel n
- Theta_2(n) = Theta_1(n) + TxPower_Rejection_ratio(k)
    - TxPower_Rejection_Ratio(k): in CNPC channel k satisfying RTCA CNPC MOPS transmission mask requirements, a ratio of peak power to channel bandwidth point power
- RTCA CNPC MOPS standards Annex: considering Baseline Radio and considering TxPower_Rejection_Ratio = 40 dB regardless of k
    - Theta_2 = Theta_1 + 40 dB Theta_3(n, k): CNPC channel k available U/D tolerance level not adjacent to CNPC channel n
- Theta_3(n) = Theta_2(n) + 25
- RTCA CNPC MOPS standards Annex: considering Baseline Radio and considering a fixed value regardless of k
    - Theta_3 = Theta_2 + 25 dB At step S420, the GCS may obtain existing CNPC channel information from the assignment database provided from the SA. The exiting CNPC channel information required for U/D calculation may include parameters related to link budget. For example, the existing CNPC channel information required for U/D calculation includes parameters required for an uplink interference analysis and the channel selection method and parameters required for a downlink interference analysis and the channel selection method, and the detailed examples are shown in Table 11.

TABLE 11

Existing CNPC channel j information required for U/D calculation

Parameters required for an uplink interference analysis and a channel assignment algorithm
- GRS 3D location of CNPC channel j
    - Position_GRS(j)

TABLE 11-continued

Existing CNPC channel j information required for U/D calculation

- GRS operation radius/height of CNPC channel j
    - Radius_GRS(j) & Height_max_UA(j) & Height_min_UA(j)
    - In P2P and P2MP types, the UA communication radius in terms of a particular GRS is limited to operation radius/height of the GRS. Particularly, in P2MP type, when the UA exceeds the operation radius/height of the GRS, it is handed over to another GRS.
    - Height_min_UA(j)
        - In RTCA CNPC MOPS standards, UAV minimum altitude is limited to satisfy adjacent channel U/D requirements
            - CNPC channel around an airport
                - Separation from other GRSs by 500 feet is required
                - GRS operation radius limited to 10 nm
                - Minimum UAV altitude: limited to 500 ft in a high power mode
            - Enroute CNPC Channel
                - GRS operation at 10 nm from the airport
                - Minimum UAV altitude: limited to 3000 ft in the high power mode
- GRS maximum transmit power (dBm/kHz) of CNPC channel j
    - TxPower_peak_GRS(j)
- A ratio of GRS maximum transmit power to channel bandwidth point transmit power of CNPC channel j
    - TxPower_Rejection_ratio_GRS(j)
- UA request reception SINR of CNPC channel j
    - Required_SNR_UA(j)
- GRS transmit antenna gain of CNPC channel j
    - TxAntGain_GRS(j)
- Another channel rejection gain of UA antenna of CNPC channel j
    - Ant_rejection_ratio_UA(j)
    - It is generally applied when it is possible to reject an adjacent channel interference, which is caused by a sharp beam characteristic in an UAV equipped with a tracking antenna with a sharp beam
    - It is non-available in most UAVs using non-directional antennas, so that 0 dB is applied
- Uplink channel bandwidth of CNPC channel j
    - N_BW_GRS(j)
Parameters required for a downlink interference analysis and a channel assignment algorithm
- GRS 3D location of CNPC channel j
    - Position_GRS(j)
- GRS operation radius/height of CNPC channel j
    - Radius_GRS(j) & Height_max_UA(j) & Height_min_UA(j)
    - In P2P and P2MP types, the UA communication radius in terms of a particular GRS is limited to operation radius/height of the GRS. Particularly, in P2MP type, when the UA exceeds the operation radius/height of the GRS, it is handed over to another GRS.
    - Height_min_UA(j)
        - In RTCA CNPC MOPS standards, UAV minimum altitude is limited to satisfy adjacent U/D requirements
            - CNPC channel around the airport
                - Separation from other GRSs by 500 feet is required
                - GRS operation radius limited to 10 nm
                - Minimum UAV altitude: limited to 500 ft in a high power mode
            - Enroute CNPC channel
                - GRS operation at 10 nm from the airport
                - Minimum UAV altitude: limited to 3000 ft in the high power mode
- UA maximum transmit power (dBm/kHz) of CNPC channel j
    - TxPower_peak_UA(j)
- A ratio of UA maximum transmit power to channel bandwidth point transmit power of CNPC channel j
    - TxPower_Rejection_ratio_UA(j)
- GRS request reception SINR of CNPC channel j
    - Required_SNR_GRS(j)
- UA transmit antenna gain of CNPC channel j
    - TxAntGain_UA(j)

TABLE 11-continued

Existing CNPC channel j information required for U/D calculation

- Another channel rejection gain of GRS antenna of CNPC channel j
    - Ant_rejection_ratio_GRS(j)
    - It is generally applied when it is possible to reject an adjacent channel interference, which is caused by a sharp beam characteristic in a GRS equipped with a tracking antenna including a sharp beam
    - It is non-available in a GRS using a sector antenna that supports non-directional and multiple UAVs, so that 0 dB is applied
- Downlink channel bandwidth of CNPC channel j
    - N_BW_UA(j)

At step S430, the GCS may search for its own CNPC channel and the CNPC channel operable in the beyond radio line of sight (BRLOS) environment, on the basis of assignment database information on the existing CNPC channels provided from the SA. The detailed operation at step S430 will be described with reference to FIG. 5.

Figure 5:
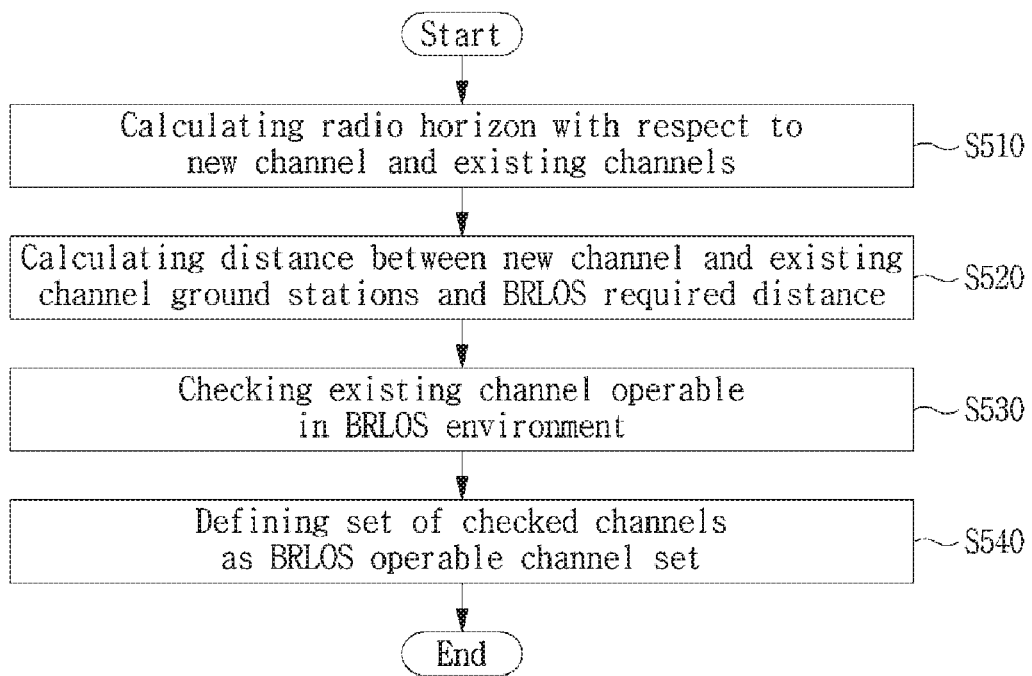
FIG. 5 is a diagram illustrating detailed operations of searching for a CNPC channel operable in a BRLOS environment according to the present disclosure.

FIG. 5 is a diagram illustrating detailed operations of the searching for the CNPC channel operable in the BRLOS environment according to the present disclosure.

At step S510, the GCS may calculate a radio horizon distance with respect to its own CNPC channel and existing CNPC channels. The radio horizon distance may mean the maximum distance between two objects, at which RLOS is possible, or the distance at which two objects to interfere with each other enter BRLOS.

Equation 1 represents radio horizon distance calculation between its own UA and the GRS of the existing CNPC channel j, and Equation 2 represents radio horizon distance calculation between its own GRS and the UA of the existing CNPC channel j.

$$D\_RHorizon\_UA(j)(km)=4.13\times(\sqrt{Height\_max\_UA\_new}+\sqrt{Height\_GRS(j)})(m) \quad \text{[Equation 1]}$$

$$D\_RHorizon\_GRS(j)(km)=4.13\times(\sqrt{Height\_GRS\_new}+\sqrt{Height\_max\_UA(j)})(m) \quad \text{[Equation 2]}$$

In Equation 1, the value of 4.13 corresponds to a factor for radio horizon calculation and the value is exemplary.

At step S520, the GCS may calculate the distance between its own CNPC channel and the GRS of the existing CNPC channel and a BRLOS required distance.

Equation 3 represents calculation of the distance between its own GRS and the GRS of the CNPC channel j, and Equation 4 represents calculation of the BLOS required distance between its own GRS and the GRS of the existing CNPC channel j.

$$D\_toGRS(j)=|Position\_GRS\_new-Position\_GRS(j)| \quad \text{[Equation 3]}$$

$$D\_BRLOS(j)=\max\{D\_RHorizon\_UA(j)+D\_Rhorizon\_GRS(j)+Radius\_GRS(j), Radius\_GRS\_new\} \quad \text{[Equation 4]}$$

At step S530, the GCS may check its own CNPC channel and the CNPC channel that may operate in the BRLOS environment. For example, the GCS may find the existing CNPC channel j that satisfies (D_toGRS(j)>D_BRLOS(j)) from j=1 to N.

At step S540, the GCS may define a set of checked existing CNPC channels as a BRLOS operable CNPC channel set, namely, ChSET_BRLOS. ChSET_BRLOS is defined as Equation 5 below. Here, the frequency of the CNPC channel j belongs to ChSET_BRLOS may be reused.

$$ChSET\_BRLOS=U\{CH(j)\} \text{ where } (D\_toGRS(j)>D\_BRLOS(j)) \quad \text{[Equation 5]}$$

Referring back to FIG. 4, at step S440, the GCS may select its own CNPC channel and a set of the existing CNPC channels operated in the radio line of sight (RLOS) environment, namely, ChSET_RLOS, as follows. ChSET_RLOS is defined as Equation 6 below.

$$ChSET\_RLOS=ChSET\_Total \cap ChSET\_BRLOS^C \quad \text{[Equation 6]}$$

In Equation 6, ChSET_total means a previously assigned CNPC channel set, ChSET_total={CH(1), CH(2), ..., CH(N−1), CH(N)} (here, N denotes the number of previously assigned CNPC channels).

At step S450, on the basis of assignment database information on the existing CNPC channels provided by the SA the GCS may calculate the interference in the existing CNPC channel m operating in the RLOS environment by its own CNPC channel requested for new assignment in addition to the U/D value for the interference analysis of the existing CNPC channel to its own CNPC channel. Detailed operations of step S450 will be described with reference to FIG. 6.

Figure 6:
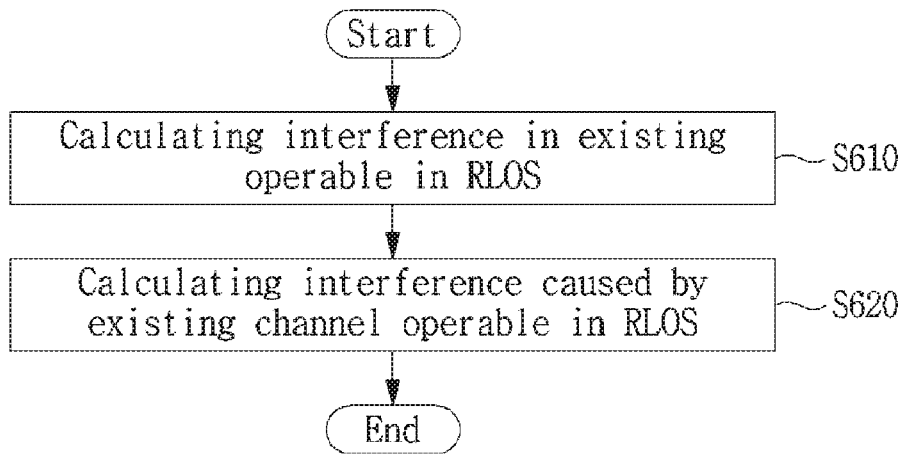
FIG. 6 is a diagram illustrating detailed operation of calculating a U/D value with an existing channel according to the present disclosure.

FIG. 6 is a diagram illustrating detailed operation of calculating the U/D value with the existing channel according to the present disclosure.

At step S610, the GCS may calculate the interference, namely, U/D_to(m) in the existing CNPC channel m operating in RLOS by a new CNPC channel. Here, a new CNPC channel requested for assignment corresponds to an undesired signal, and the previously assigned CNPC channel m in the RLOS environment corresponds to a desired signal. In this case, CH(m)∈ChSET_RLOS is possible. U/D_to(m) is defined as Equation 7 below.

$$U/D\_to(m)=TxEIRP\_new-TxEIRP(m)-20\log(D\text{new}/D(m))+\text{Margin} \quad \text{[Equation 7]}$$

In Equation 7, Margin is defined as Equation 8 below.

$$\text{Margin}=\sqrt{M\_multipath\_boosting^2+M\_AntGain\_boosting^2+M\_Excess\_pathloss^2+M\_Airframe\_sadowing^2} \quad \text{[Equation 8]}$$

In the case of the uplink, in Equation 7, TxEIRP_new, TxEIRP(m), Dnew, and D(m) are defined as Equation 9 below.

$$TxEIRP\_new = TxPower\_peak\_GRS\_new + TxANtGain\_GRS\_new$$

$$TxEIRP(m) = TxPower\_peak\_GRS(m) + TxANTGain\_GRS(m)$$

$$Dnew = \sqrt{D\_toGRS(m)^2 + (Height\_min\_UA(m) - Height\_GRS\_new)^2}$$

$$D(m) = \sqrt{Radius\_GRS(m)^2 + (Height\_min\_UA(m) - Height\_GRS(m))^2}$$

[Equation 9]

In the case of the downlink, in Equation 7, TxEIRP_new, TxEIRP(m), Dnew, and D(m) are defined as Equation 10 below.

$$TxEIRP\_new = TxPower\_peak\_UA\_new + TxANTGain\_UA\_new$$

$$TxEIRP(m) = TxPower\_peak\_UA(m) + TxANTGain\_UA(m)$$

$$Dnew = \sqrt{D\_toGRS(m)^2 + (minimum\_Height\_UA\_new - Height\_GRS(m))^2}$$

$$D(m) = \sqrt{Radius\_GRS(m)^2 + (Height\_max\_UA(m) - Height\_GRS(m))^2}$$

[Equation 10]

At step S620, the GCS may calculate the interference, namely, U/D_from(m), in the new CNPC channel caused by the existing CNPC channel m operating in RLOS. Here, the previously assigned CNPC channel m in the RLOS environment corresponds to an undesired signal, and the new CNPC channel requested for assignment corresponds to a desired signal. In this case, CH(m) ∈ ChSET_RLOS is possible. U/D_from(m) is defined as Equation 11 below.

$$U/D\_from(m) = TxEIRP(m) - TxEIRP\_new - 20\log(D(m)/Dnew) + Margin \quad [\text{Equation 11}]$$

In Equation 11, Margin is defined as Equation 12 below.

$$Margin = \sqrt{M\_multipath\_boosting^2 + M\_AntGain\_boosting^2 + M\_excess\_pathloss^2 + M\_Airframe\_sadowing^2}$$

[Equation 12]

In the case of the uplink, in Equation 11, TxEIRP(m), TxEIRP_new, D(m), and Dnew are defined as Equation 13 below.

$$TxEIRP(m) = TxPower\_peak\_GRS(m) + TxANTGain\_GRS(m)$$

$$TxEIRP\_new = TxPower\_peak\_GRS\_new + TxANTGain\_GRS\_new$$

$$D(m) = \sqrt{D\_toGRS(m)^2 + (Height\_min\_UA\_new - Height\_GRS(m))^2}$$

$$Dnew = \sqrt{Radius\_GRS\_new^2 + (Height\_min\_UA\_new - Height\_GRS\_new)^2}$$

[Equation 13]

In the case of the downlink, in Equation 11, TxEIRP(m), TxEIRP_new, D(m), and the Dnew are defined as Equation 14 below.

$$TxEIRP(m) = TxPower\_peak\_UA(m) + TxANTGain\_UA(m)$$

[Equation 14]

$$TxEIRP\_new = TxPower\_peak\_UA\_new + TxANTGain\_UA\_new$$

$$D(m) = \sqrt{D\_toGRS(m)^2 + (minimum\_Height\_UA(m) - Height\_GRS\_new)^2}$$

$$Dnew = \sqrt{Radius\_GRS(m)^2 + (Height\_max\_UA\_new - Height\_GRS\_new)^2}$$

Figure 7:
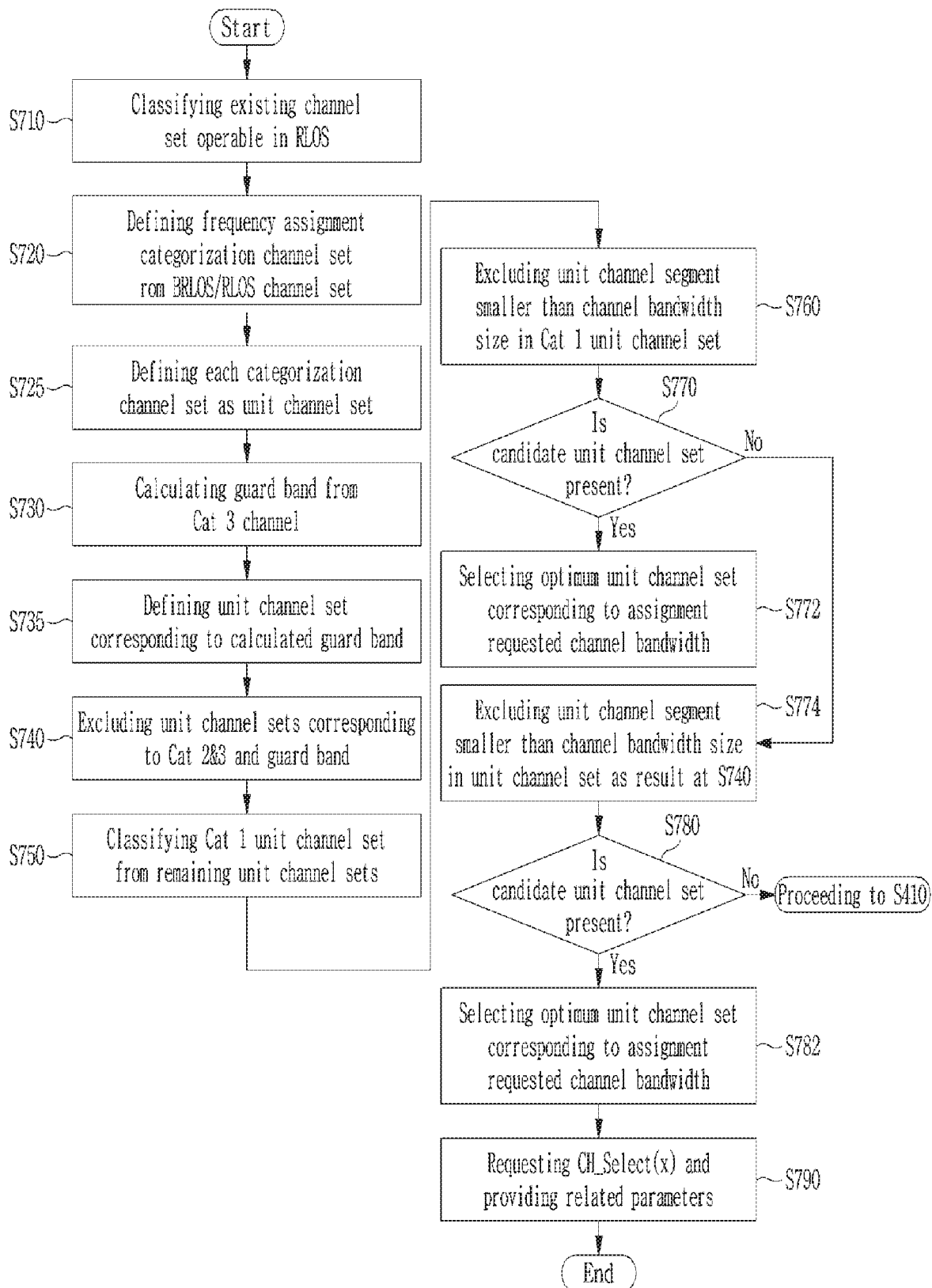
FIG. 7 is a diagram illustrating detailed operations of a process of channel selection according to the present disclosure.

FIG. 7 is a diagram illustrating detailed operations of a process of channel selection according to the present disclosure.

The operations of 12 steps shown in FIG. 7 are included in the detailed operations of the performing of the channel selection at step S320 shown in FIG. 3.

At step S710, on the basis of U/D_to(m) and U/D_from (m) calculated at the performing of the interference analysis at step S310, the GCS may define multiple channel sets with respect to the previously assigned CNPC channel m existing in the RLOS environment. For example, the existing channels operating in the RLOS environment may be classified into six channel sets according to a predetermined criterion. For example, six channel sets include ChSET_reuse_to, ChSET_adj_to, ChSET_non-adj_to, ChSET_reuse_from, ChSET_adj_from, and ChSET_non-adj_from. Examples of channel sets are shown in Table 12 below.

TABLE 12

ChSET_reuse_to
- A set of existing CNPC channels with frequency reuse possible in terms of interfering
- If U/D_to(m) < Theta_1(m), CH(m) ∈ ChSET_RLOS_reuse_to
ChSET_adj_to
- A set of existing CNPC channels which are adjacent and available in terms of interfering
- If Theta_1(m)≤U/D_to(m) < Theta_2(m), CH(m) ∈ ChSET_RLOS_adj_to
ChSET_non-adj_to
- A set of existing CNPC channels which are non-adjacent and available in terms of interfering
- If Theta_2(m)≤U/D_to(m) < Theta_3(m), CH(m) ∈ ChSET_RLOS_non-adj_to
ChSET_reuse_from
- A set of existing CNPC channels with frequency reuse possible in terms of being interfered
- If U/D_to(m) < Theta_1(m), CH(m) ∈ ChSET_RLOS_reuse_to
ChSET_adj_from
- A set of existing CNPC channels which are adjacent and available in terms of being interfered
- If Theta_1(m)≤U/D_to(m) < Theta_2(m), CH(m) ∈ ChSET_RLOS_adj_to
ChSET_non-adj_from
- A set of existing CNPC channels which are non-adjacent and available in terms of being interfered
- If Theta_2(m)≤U/D_to(m) < Theta_3(m), CH(m) ∈ ChSET_RLOS_non-adj_to At step S720, on the basis of the six RLOS channel sets defined at step S710 and one BRLOS channel set defined at the performing of the interference analysis, three frequency assignment categories may be defined. Examples of the frequency assignment categories are shown in Table 13 below.

TABLE 13

Categorization 1: existing CNPC channels with frequency reuse possible
- Defining a CNPC channel set corresponding to categorization 1 as ChSET_reuse
- ChSET_reuse = ChSET_BRLOS ∪ (ChSET_reuse_to ∩ ChSET_reuse_from)
Categorization 2: existing CNPC channels which are adjacent and assignable
- Defining a CNPC channel set corresponding to categorization 2 as ChSET_adj
- ChSET_adj = (ChSET_Total ∩ ChSET_reuse$^C$) ∩ {(ChSET_reuse_to ∪ ChSET_adj_to) ∩ (ChSET_reuse_from ∪ ChSET_adj_from)}
Categorization 3: existing CNPC channels which are non-adjacent and assignable
- Defining a CNPC channel set corresponding to categorization 3 as ChSET_non-adj
- ChSET_non-adj = ChSET_Total ∩ ChSET_reuse$^C$ ∩ ChSET_adj$^C$ At step S725, a channel set corresponding to each categorization may be defined as a set of unit channel (UC) numbers. The detailed examples are shown in Table 14 below. In table 14 below, q, r, and t denote channel indexes.

TABLE 14

UCSet_reuse = ∪ {BC(N_start(q)), ..., BC(N_start(q)+N_BW(q)-1)}
    Where CH(q) = {BC(N_start(q)), ..., BC(N_start(q)+N_BW(q)-1)} ∈ ChSET_reuse
UCSet_adj = ∪ {BC(N_start(r)), ..., BC(N_start(r)+N_BW(r)-1)}
    Where CH(r) = {BC(N_start(r)), ..., BC(N_start(r)+N_BW(r)-1)} ∈ ChSET_ajd
UCSet_non-adj = ∪ {BC(N_start(t)), ..., BC(N_start(t)+N_BW(t)-1)}
    Where CH(t) = {BC(N_start(t)), ..., BC(N_start(t)+N_BW(t)-1)} ∈ ChSET_non-adj At step S730, the size of guard band required between the existing CNPC channel corresponding to the categorization 3 and a channel to be newly assigned may be calculated. That is, since categorization 3 corresponds to a category of channels that are unusable as being adjacent to each other due to large interference, a guard band is required to prevent interference. The guard band may correspond to a space that enables influence of interference between the channels, to be to avoided by considering the worst case. For example, referring to FIG. 1, in the case of adjacent first and second channels, the guard band may be set in such a manner that the boundary in the high frequency direction of the $C_1$ kHz band of the first channel with the low center frequency coincides with the boundary in the low frequency direction of the $C_2$ kHz band of the second channel with the high center frequency. In the case of non-adjacent first and second channels, the guard band may be set in such a manner that the boundary in the high frequency direction of the $2C_1$ kHz band of the first channel with the low center frequency coincides with the boundary in the low frequency direction of the $2C_2$ kHz band of the second channel with the high center frequency. The size of the guard band, namely, N_GB(t) may be defined as Table 15 below.

TABLE 15

N_GB(t) = max { N_BW(t)+N_BW_new/2, N_BW(t)/2+N_BW_new }
    Where CH(t) = {BC(N_start(t)), ..., BC(N_start(t)+N_BW(t)-1)} ∈ ChSET_non-adj At step S735, a unit channel number corresponding to the guard band of the unit channel set corresponding to categorization 3 may be determined. As described above, an example of defining a unit channel set corresponding to the guard band is shown in Table 16.

TABLE 16

UCSet_non-adj_wt_GB = ∪ { BC(N_start(t)-N_GB(t)),..., BC(N_start(t)-1), BC(N_start(t)), ..., BC(N_start(t)+N_BW(t)-1), BC(N_start(t)+1), ..., BC(N_start(t)+N_GB(t))}
    Where CH(t) = {BC(N_start(t)), ..., BC(N_start(t)+N_BW(t)-1)} ∈ ChSET_non-adj At step S740, in unit channel sets corresponding to the entire UAV CNPC frequency band, the unit channel set corresponding to categorization 2 and the unit channel set corresponding to categorization 3 including a guard section may be excluded. An example of this is shown in Table 17.

TABLE 17

UC_noCA2&3 = UCSet_C-band ∩ UCset_adj$^C$ ∩ UCset_non-adj_wt_GB$^C$

At step S750, in sets excluding the unit channel sets corresponding to categorization 2 and categorization 3 determined at step S740, the unit channel set corresponding to categorization 1 may be determined. An example of this is shown in Table 18.

TABLE 18

UC_noCA2&3_reuse = UC_noCA2&3 ∩ UCSet_reuse

At step S760, in the set determined at step S750 (namely, the unit channel set corresponding to categorization 1, in the sets excluding the unit channel sets corresponding to categorization 2 and categorization 3), a unit channel segment that is smaller than the bandwidth size of the channel to be newly assigned may be found and excluded. An example of this is shown in Table 19.

TABLE 19

S760_1: the unit channel segment set that is smaller than the channel bandwidth size is found.
UCset_small_segment = ∪ {BC(x), ..., BC(x+u)}
    Where {BC(x), ..., BC(x+u)} ∈ UC_noCA1&2_reuse
    BC(x-1) & BC(x+u+1) ∉ UC_noCA1&2_reuse, 1≤u < N_BW_new
S760_2: the found unit channel segment set is excluded from UC_noCA1&2_reuse set.
UC_candidate_reuse = UC_noCA1&2_reuse ∩ UCset_small_segment$^C$
S770: when UC_candidate_reuse ≠ ∅ (namely, the candidate unit channel set remains), proceeding to step S772,
When UC_candidate_reuse = ∅ (namely, the candidate unit channel set is not present), proceeding to step S774.

At step S772, the optimum unit channel set corresponding to its own CNPC channel bandwidth may be selected from the UC_candidate_reuse set found at step S770. The criterion for selecting the optimum unit channel set is to select the unit channel set that minimizes the interference from the existing CNPC channel. Alternatively, the unit channel set that minimizes the interference to the existing CNPC channels may be selected.

The example of selecting the unit channel set that minimizes its own U/D value shown in Table 20.

TABLE 20

$\min_{CH\_selection(x)} \Sigma_{n=2-x, n \neq 1}^{P-x+1}$ U/D_from(CH_num(UC(x + n − 1)))
- CH_selection (x) = {BC(x), ..., BC(x+N_BW_new)}
    Where UCset_selection(x) ∈ UC_candidate_reuse
- CH_num(UC(x+n−1)): CNPC channel number to which unit channel number (x+n−1) is assigned
    If it is available, U/D_from(CH_num)=U/D_from(m) where CH_num=m
    If not, U/D_from(CH_num)=0
- When it is available, U/D_from(m)
    - When CH_num=m is a channel operating in the RLOS environment with n=1 to N_BW_new
        U/D_from(m) = TxEIRP(m)− TxEIRP_new − 20log(D(m)/Dnew) + Margin
    - When CH_num=m is a channel operating in the BRLOS environment with n=1 to N_BW_new
        U/D_from(m) = TxEIRP(m)− TxEIRP_new − 40log(D(m)/Dnew) + Margin
    - When CH_num=m is a channel operating in the RLOS environment with n=1−N_BW(m)/2 to 0 and n=N_BW_new to N_BW_new+N_BW(m)/2
        U/D_from(m) = TxEIRP(m)− TxEIRP_new − 20log(D(m)/Dnew) + Margin + TxPower_Rejection_ratio(m)
    - When CH_num=m is a channel operating in the BRLOS environment with n=1−N_BW(m)/2 to 0 and n=N_BW_new to N_BW_new+N_BW(m)/2
        U/D_from(m) = TxEIRP(m)− TxEIRP_new − 40log(D(m)/Dnew) + Margin + TxPower_Rejection_ratio(m)
    - When CH_num=m is a channel operating in the RLOS environment with the remaining n
        U/D_from(m) = TxEIRP(m)− TxEIRP_new − 20log(D(m)/Dnew) + Margin + TxPower_Rejection_ratio(m) +TxPower_Rejection_ratio(m)+25
    - When CH_num=m is a channel operating in the RRLOS environment with the remaining n
        U/D_from(m) = TxEIRP(m)− TxEIRP_new − 40log(D(m)/Dnew) + Margin + TxPower_Rejection_ratio(m)+25

The example of selecting the unit channel set that minimizes the U/D value of another CNPC shown in Table 21.

TABLE 21

$\min_{CH\_selection(x)} \Sigma_{n=2-x, n \neq 1}^{P-x+1}$ U/D_tp(CH_num(UC(x + n − 1)))
- CH_selection (x) = {BC(x), ..., BC(x+N_BW_new)}
    Where UCset_selection(x) ∈ UC_candidate_reuse
- CH_num(UC(x+n−1)): CNPC channel number to which unit channel number (x+n−1) is assigned
    If it is available, U/D_to(CH_num)=U/D_to(m) where CH_num=m
    If not, U/D_to(CH_num)=0
- When it is available, U/D_to(m)
    - When CH_num=m is a channel operating in the RLOS environment with n=1 to N_BW_new
        U/D_to(m) = TxEIRP_new − TxEIRP(m) − 20log(Dnew)/D(m)) + Margin
    - When CH_num=m is a channel operating in the RLOS environment with n=1 to N_BW_new
        U/D_to(m) = TxEIRP_new − TxEIRP(m) − 40log(Dnew/D(m)) + Margin
    - When CH_num=m is a channel operating in the RLOS environment with n=1−N_BW_new/2 to 0 and n=N_BW_new to N_BW_new+N_BW_new/2
        U/D_to(m) = TxEIRP_new − TxEIRP(m) − 20log(Dnew/D(m)) + Margin + TxPower_Rejection_ratio(m)
    - When CH_num=m is a channel operating in the BRLOS environment with n=1−N_BW_new/2 to 0 and n=N_BW_new to N_BW_new+N_BW_new/2
        U/D_to(m) = TxEIRP_new − TxEIRP(m) − 40log(Dnew/D(m)) + Margin+TxPower_Rejection_ratio(m)
    - When CH_num=m is a channel operating in the RLOS environment with the remaining n
        U/D_to(m) = TxEIRP_new − TxEIRP(m) − 20log(Dnew/D(m)) + Margin + TxPower_Rejection_ratio(m) +TxPower_Rejection_ratio(m)+25
    - When CH_num=m is a channel operating in the RRLOS environment with the remaining n
        U/D_to(m) = TxEIRP_new − TxEIRP(m) − 40log(Dnew/D(m)) + Margin+TxPower_Rejection_ratio(m)+25

At step S774, in the set determined at step S740 (namely, UC_noCA1&2 set), a unit channel segment that is smaller than the bandwidth size of the channel to be newly assigned may be found and excluded. An example of this is shown in Table 22.

TABLE 22

S774_1: the unit channel segment set that is smaller than the channel bandwidth size is found.
- UCset_small_segment = ∪ {BC(x), ..., BC(x+u)}
    Where {BC(x), ..., BC(x+u)} ∈ UC_noCA1&2
        BC(x−1) & BC(x+u+1) ∉ UC_noCA1&2, u < N_BW_new
S774_2: the found unit channel segment set is excluded from UC_noCA1&2 set.
- UC_candidate = UC_noCA1&2 ∩ UCset_small_segment$^C$
S780:
When UC_candidate ≠ ∅ (namely, the candidate unit channel set remains), proceeding to step S782,
When UC_candidate = ∅ (namely, the candidate unit channel set is not present), the updated CNPC assignment database and its own transmission and reception specification are updated and the performing of the interference analysis at step S410 restarts.

At step S782, the optimum unit channel set corresponding to its own CNPC bandwidth may be selected from the set at step S780 (namely, UC_candidate set). The criterion for selecting the optimum unit channel set is to select the unit channel set that minimizes the interference from the existing CNPC channel. Alternatively, the unit channel set that minimizes the interference to the existing CNPC channels may be selected. The difference from step S772 is that UCset_selection(x) being considered is present within UC_candidate step at S782.

At step S790, the selected CH_Select(x) is requested to the SA, and parameters required for the uplink/downlink interference analysis and channel approval may be provided as its own CNPC transmission and reception specification information. Examples of the parameter are shown in Table 23.

Figure 8:
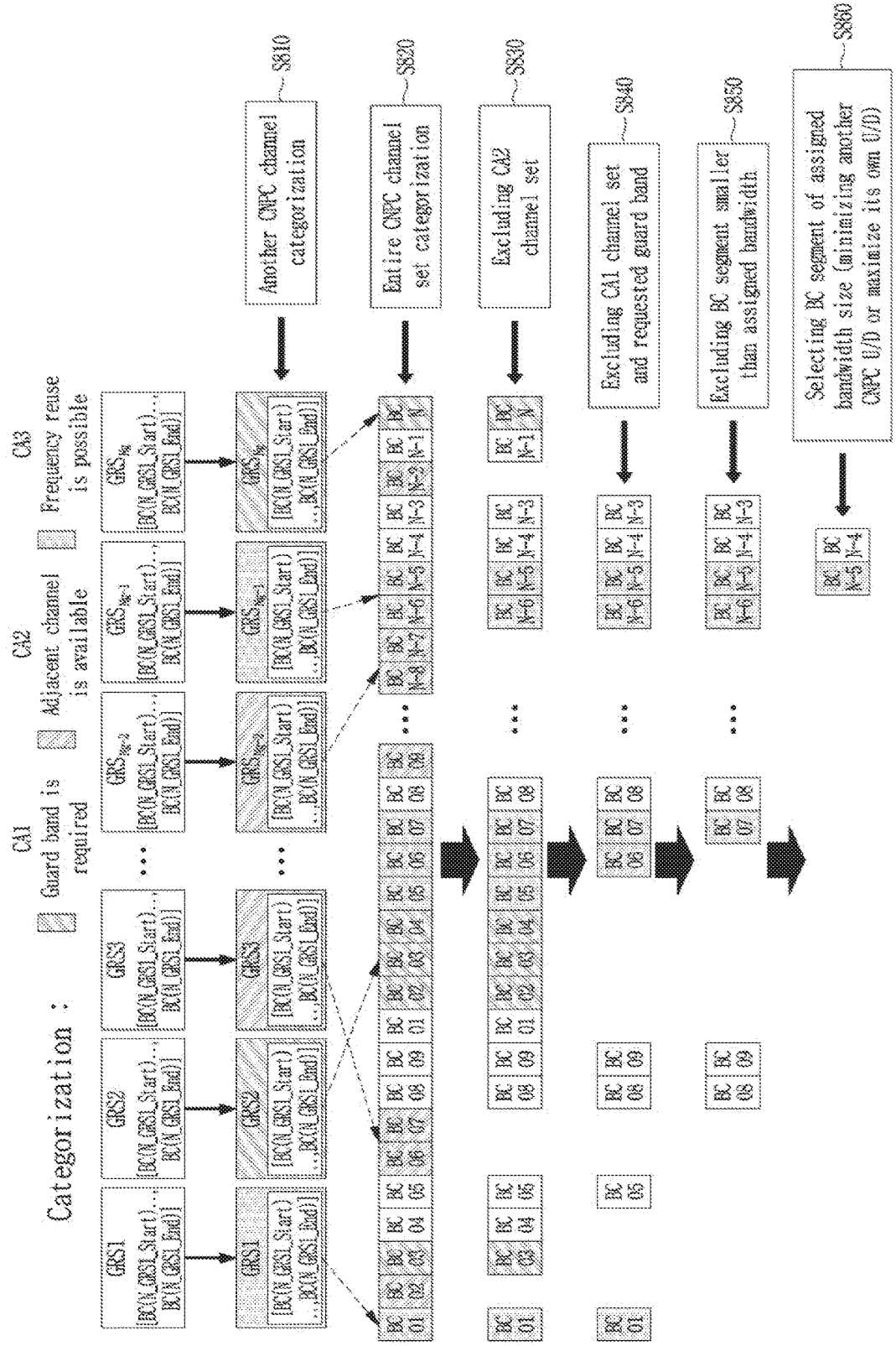
FIG. 8 is a diagram illustrating an example of a channel selection algorithm according to the present disclosure.

FIG. 8 is a diagram illustrating an example of a channel selection algorithm according to the present disclosure.

At step S810, categories for other CNPC channels may be determined. That is, the first category CA1 corresponds to the guard band being required, the second category CA2 corresponds to the adjacent channel being available, and the third category CA3 corresponds to the frequency reuse being available. This may correspond to step S710 in the example in FIG. 7.

At step S820, categories for all CNPC channel sets may be determined and defined as unit channel sets. This may correspond to steps S720 to S725 in the example in FIG. 7.

At step S830, the channel set corresponding to the CA2 may be excluded, and at step S840, the CA1 channel set and the requested guard band may be excluded. This may correspond to steps S730 to S740 in the example in FIG. 7.

TABLE 23

Parameters required for the uplink interference analysis and channel assignment algorithm
- GRS 3D location of anew CNPC channel
    Position_GRS_new
- GRS operation radius/height of the new CNPC channel
    Radius_GRS_new & Height_max_UA_new & Height_min_UA_new
    Height_min_UA_new
- GRS maximum transmit power (dBm/kHz) of the new CNPC channel
    TxPower_peak_GRS_new
- A ratio of GRS maximum transmit power to channel bandwidth point transmit power of the new CNPC channel
    TxPower_Rejection_ratio_GRS_new
- UA request reception SINR of the new CNPC channel
    Required_SNR_UA_new
- GRS transmit antenna gain of the new CNPC channel
    TxAntGain_GRS_new
- Another channel rejection gain of UA antenna of the new CNPC channel
    Ant_rejection_ratio_UA_new
- Uplink channel bandwidth of the new CNPC channel
    N_BW_GRS_new
Parameters required for the downlink interference analysis and the channel assignment algorithm
- GRS 3D poition of the new CNPC channel
    Position_GRS_new
- GRS operation radius/height of the new CNPC channel
    Radius_GRS_new & Height_max_UA_new & Height_min_UA_new
    Height_min_UA_new
- UA maximum transmit power (dBm/kHz) of the new CNPC channel
    TxPower_peak_UA_new
- A ration of UA maximum transmit power to channel bandwidth point transmit power of the New CNPC channel
    TxPower_Rejection_ratio_UA_new
- GRS request reception SINR of the new CNPC channel
    Required_SNR_GRS_new
- UA transmit antenna gain of the new CNPC channel
    TxAntGain_UA_new
- Another channel rejection gain of GRS antenna of the new CNPC channel
    Ant_rejection_ratio_GRS_new
- The downlink channel bandwidth of the New CNPC Channel
    N_BW_UA_new At step S850, the BC segment smaller than the assigned bandwidth may be excluded. This may correspond to steps S750 to S760, or S774 in the example in FIG. 7.

After theses exclusion steps, when the candidate unit channel set remains (for example, the result at step S770 in the example in FIG. 7 is "Y"), the BC segment of the assigned bandwidth size may be selected on the basis of the criterion that minimizes other CNPC U/D values or the criterion that maximizes its own U/D value at step S860. This may correspond to step S772 in the example in FIG. 7.

Not shown in FIG. 8, after theses exclusion steps, when no candidate unit channel set remains (for example, the result at step S770 in the example in FIG. 7 is "N"), the unit channel segment smaller than the channel bandwidth is excluded and the optimum unit channel set is selected depending on whether the candidate unit channel set remains, or the performing of the interference analysis restarts according to the example shown in FIG. 7.

Figure 9:
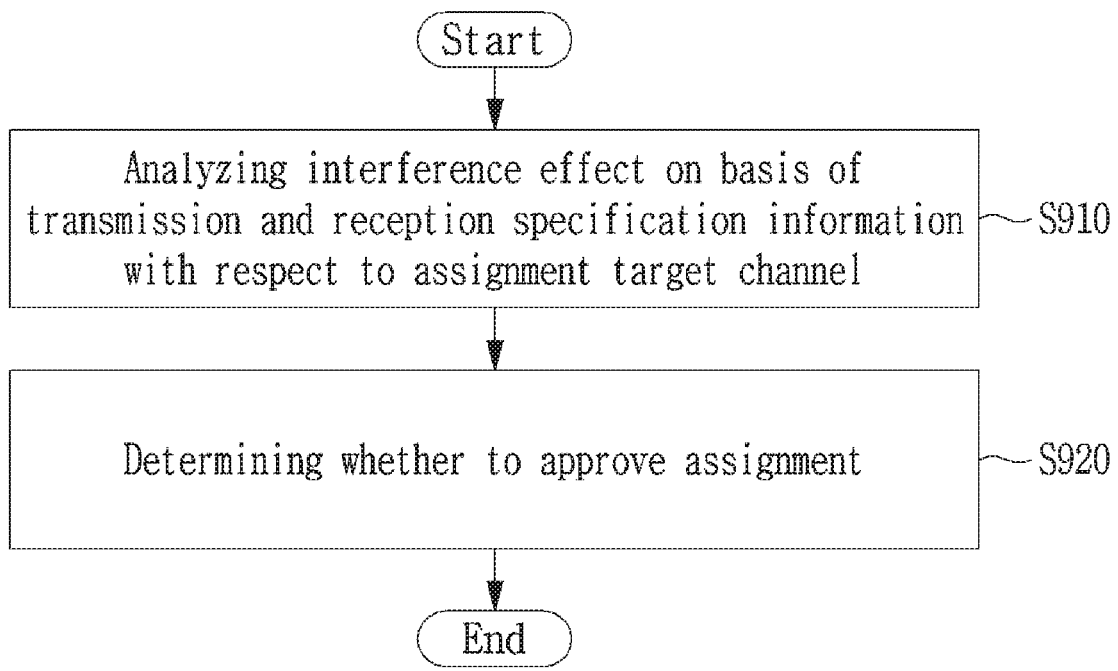
FIG. 9 is a diagram illustrating a process of performing an interference effect check and channel approval in a SA according to the present disclosure.

FIG. 9 is a diagram illustrating a process of performing an interference effect check and channel approval in a SA according to the present disclosure.

The operations of two steps shown in FIG. 9 may be included in the detailed operations of the process of performing the interference effect check and channel approval at step S330 shown in FIG. 3.

At step S910, on the basis of the new CNPC channel transmission and reception specification information provided from the GCS, the SA may analyze interference effect on the existing adjacent CNPC channel with respect to the channel CH_select(x) requested by the GCS.

When multiple GCSs simultaneously request channels, according to a first in, first out (FIFO) scheme, the interference effect on the requested channel is analyzed and whether to approve the channel is determined, independently, in the order of the GCS that makes a request first. Here, it is assumed that the interference analysis algorithm on the user side (for example, the GCS) is equal to the interference analysis algorithm on the central management side (for example, the SA).

Table 24 below shows an example of the interference analysis in the SA.

At step S920, for all UC(n), when review(n) is valid, the SA approves the new CNPC channel requested by the GCS. When invalid review(n) is present, the SA notifies of channel assignment impossibility.

In the above-described embodiments of the present disclosure, the method of performing the interference analysis and channel selection for supporting the distributed dynamic channel assignment procedure has been described. Furthermore, the method of performing the interference analysis and channel selection for supporting the centralized dynamic channel assignment procedure will be described hereinbelow.

When the SA considers the method of performing the interference analysis and channel selection on the basis of the CNPC transmission and reception specification information provided from the GCS, the centralized channel assignment method, unlike the distributed type, is required to implement the method of performing the interference analysis and channel selection according to CNPC channel combinations to be assigned to all GCSs. However, in the centralized type, when multiple GCSs simultaneously request channels and the SA considers the method of assigning a channel to single GCS each time in sequence using the FIFO scheme like the distributed type, the method of performing the interference analysis and channel selection proposed in the distributed type is reused.

Figure 10:
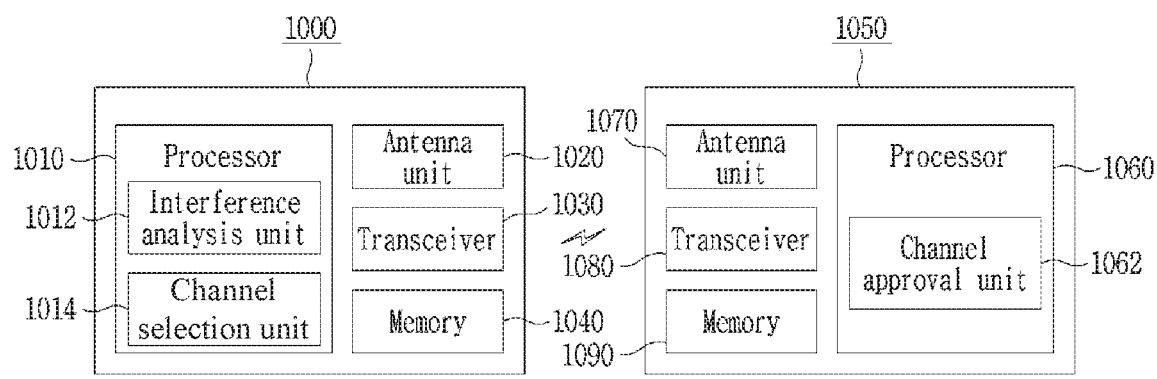
FIG. 10 is a diagram illustrating configuration of a user device and a central management device according to the present disclosure.

FIG. 10 is a diagram illustrating configuration of a user device and a central management device according to the present disclosure.

A user device 1000 may include a processor 1010, an antenna unit 1020, a transceiver 1030, and a memory 1040. The user device 1000 may correspond to the GCS (or the pilot, the operator, the service provider) of the present disclosure.

The processor 1010 may include an interference analysis unit 1012 and a channel selection unit 1014, may select the UAV CNPC channel on the basis of the channel interference analysis, and may communicate with the UAV on the assigned channel. The processor 1010 may perform processing for the interference analysis, channel selection, and UAV communication as well as may control overall operation of the user device 1000.

The antenna unit 1020 may include one or more physical antennas, and may support multiple-input and multiple-output (MIMO) transmission and reception when including multiple antennas.

TABLE 24

- CH_selection(x) = {BC(x), ..., BC(x+N_BW_new)}
- U/D_to(CH_num(UC(x+n−1))) is calculated
    CH_num(UC(x+n−1)): CNPC channel number to which unit channel number (x+n−1) is assigned
    n=1−N_BW_new/2 to N_BW_new+N_BW_new/2
- If it is available, U/D_to(CH_num)=U/D_to(m) where CH_num=m
- If not, U/D_to(CH_num)=0
- When it is available, U/D_to(m)
    - When CH_num=m is a channel operating in the RLOS environment with n=1 to N_BW_new
        U/D_to(m) = TxEIRP_new − TxEIRP(m) − 20log(Dnew/D(m)) + Margin
            If U/D_to(m) < Thetha_1(m), Review(n) = valid
            otherwise, Review(n) = invalid
    - When CH_num=m is a channel operating in the RLOS environment with n=1 to N_BW_new
        U/D_to(m) = TxEIRP_new − TxEIRP(m) − 40log(Dnew/D(m)) + Margin
            If U/D_to(m) < Thetha_1(m), Review(n) = valid
            otherwise, Review(n) = valid
    - When CH_num=m is a channel operating in the RLOS environment with n=1−N_BW_new/2 to 0 and n=N_BW_new to N_BW_new+N_BW_new/2
        U/D_to(m) = TXEIRP_new − TxEIRP(m) − 20log(Dnew/D(m)) + Margin
            If U/D_to(m) < Thetha_2(m), Review(n) = valid
            If not, Review(n) = valid The transceiver 1030 may include a radio frequency (RF) transmitter and an RF receiver.

The memory 1040 may store information computed by the processor 1010, software, an operating system, an application related to operation of the user device 1000, and the like, and may include constituents, such as buffers, and the like.

The processor 1010 of the user device 1000 may be set to implement the operation of the user device (for example, the GCS) described in the embodiments of the present disclosure.

For example, the interference analysis unit 1012 of the processor 1010 of the user device 1000 may be configured to: obtain an interference analysis parameter and channel assignment criterion information from a central management device 1050; obtain existing communication channel information from the central management device 1050; determine a current communication channel of the user device 1000 and the existing communication channel operable in the BRLOS environment as a BRLOS channel set; determine the current communication channel of the user device 1000 and the existing communication channel operable in the RLOS environment as a RLOS channel set; and calculate a U/D value that indicates interference in the existing communication channel caused by a new communication channel and interference in the new communication channel caused by the existing communication channel, on the basis of the interference analysis parameter and the channel criterion information.

The channel selection unit 1014 may be configured to: classify the RLOS channel set on the basis of the U/D value calculated by the interference analysis unit 1012; and determine multiple categories on the basis of the classified RLOS channel set and the BRLOS channel set. Here, multiple categories may include a first category for frequency reuse, a second category for non-adjacent channel use, and a third category for adjacent channel use.

Also, the channel selection unit 1014 may be configured to: determine unit channels (UCs) corresponding to multiple categories; determine a first channel set including channels that exclude the UC corresponding to the second category, the UC corresponding to the third category, and the UC corresponding to the guard band required between the channel corresponding to the second category and the new communication channel, in the entire channel frequency band; determine a second channel set including channels that exclude a UC segment smaller than the bandwidth size of the new communication channel, in the UC corresponding to the first category in the first channel set; and select a UC set determined on the basis of the U/D value from the second channel set as a channel requested to be approved by the central management device 1050.

Also, when the channel corresponding to the second channel set is not present, the channel selection unit 1014 may be configured to: determine a third channel set including channels that exclude a UC segment smaller than the bandwidth size of the new communication channel in the first channel set; and select a UC set from the third channel set, which is determined on the basis of the U/D value as a channel requested to be approved by the central management device 1050.

The central management device 1050 may include a processor 1060, an antenna unit 1070, a transceiver 1080, and a memory 1090. The central management device 1050 may correspond to the SA of the present disclosure.

The processor 1060 may include a channel approval unit 1062 and may determine whether to assign the channel requested by the user device 1000. The processor 1060 may perform processing for channel approval as well as may control overall operation of the central management device 1050.

The antenna unit 1070 may include one or more physical antennas, and may support MIMO transmission and reception when including multiple antennas.

The transceiver 1080 may include an RF transmitter and an RF receiver.

The memory 1090 may store information computed by the processor 1060, software, an operating system, an application related to operation of the central management device 1050, and the like, and may include constituents, such as buffers, and the like.

The processor 1060 of the central management device 1050 may be set to implement the operation of the central management device (for example, the SA) described in the embodiments of the present disclosure.

The channel approval unit 1062 of the processor 1060 of the central management device 1050 may be configured to analyze the interference effect on the existing communication channel with respect to the channel requested for approval when receiving a request for approval with respect to the channel selected by the user device 1000 on the basis of the interference analysis; and assign the channel requested for approval to the user device 1000 when the result of the interference effect analysis is valid and notify the user device 1000 that the channel requested for approval is impossible to be assigned when the result of the interference effect analysis is invalid.

Also, the channel approval unit 1062 may be configured to analyze the interference effect on the existing communication channel adjacent to the channel requested for approval, on the basis of the interference analysis parameter and channel assignment criterion information provided to the user device 1000 and channel transmission and reception specification information of the user device 1000.

In operation of the user device 1000 and the central management device 1050, the same things described in the embodiments of the present invention may be applied thereto, and redundant description thereof is omitted.

Although exemplary methods of the present disclosure are represented as a series of operations for clarity of description, the order of the steps is not limited thereto. When necessary, the illustrated steps may be performed simultaneously or in a different order. In order to realize the method according to the present disclosure, other steps may be added to the illustrative steps, some steps may be excluded from the illustrative steps, or some steps may be excluded while additional steps may be included.

The various embodiments of the present disclosure are not intended to list all possible combinations, but to illustrate representative aspects of the present disclosure. The matters described in the various embodiments may be applied independently or in a combination of two or more.

Also, the various embodiments of the present disclosure may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs) general-purpose processors, controllers, micro controllers, micro processors, etc.

The scope of the present disclosure includes software or machine-executable instructions (e.g., an operating system, an application, firmware, a program, etc.) that cause operation according to the methods of the various embodiments to be performed on a device or a computer, and includes a non-transitory computer-readable medium storing such software or instructions to execute on a device or a computer.

What is claimed is:

1. A method of selecting an unmanned aerial vehicle (UAV) control channel based on an interference analysis, the method comprising:
    performing, by a user device, the interference analysis;
    selecting, by the user device, a channel based on a result of the interference analysis;
    requesting, by the user device, a central management device to approve the selected channel; and
    performing, by the user device, communication with a UAV on the channel approved by the central management device,
    wherein in response to the central management device receiving requests to approve channels from multiple user devices, the interference effect on each requested channel is analyzed and whether to approve the channel is determined, independently, in order of the user device that makes the request first.

2. The method of claim 1, wherein the performing of the interference analysis comprises:
    obtaining an interference analysis parameter and channel assignment criterion information from the central management device;
    obtaining existing communication channel information from the central management device;
    determining a current communication channel of the user device and an existing communication channel operable in beyond radio line of sight (BRLOS) environment as a BRLOS channel set;
    determining the current communication channel of the user device and an existing communication channel operable in radio line of sight (RLOS) environment as an RLOS channel set; and
    calculating an undesired/desired (U/D) value that indicates interference in the existing communication channel caused by a new communication channel and interference in the new communication channel caused by the existing communication channel, based on the interference analysis parameter and channel criterion information.

3. The method of claim 2, wherein the selecting of the channel comprises:
    classifying the RLOS channel set based on the U/D value;
    determining, at a category determination step, multiple categories based on the classified RLOS channel set and the BRLOS channel set, the multiple categories including a first category for frequency reuse, a second category for non-adjacent channel use, and a third category for adjacent channel use;
    determining unit channels (UCs) respectively corresponding to the multiple categories;
    determining a first channel set that includes channels except for the UC corresponding to the second category, the UC corresponding to the third category, and the UC corresponding to a guard band required between a channel corresponding to the second category and the new communication channel, in an entire channel frequency band;
    determining a second channel set that includes channels except for a UC segment smaller than a bandwidth size of the new communication channel, in the UC corresponding to the first category in the first channel set; and
    selecting a UC set determined based on the U/D value from the second channel set as a channel requested to be approved by the central management device.

4. The method of claim 3, wherein the selecting of the channel further comprises:
    determining a third channel set that includes channels except for the UC segment smaller than the bandwidth size of the new communication channel in the first channel set, when a channel corresponding to the second channel set is not preset; and
    selecting a UC set determined based on the U/D value from the third channel set as the channel requested to be approved by the central management device.

5. The method of claim 4, wherein the requesting of the central management device to approve the selected channel comprises: transmitting the UC set determined based on the U/D value and channel transmission and reception specification information of the user device to the central management device.

6. The method of claim 2, wherein the interference analysis parameter comprises at least one among a margin for multi path enhancement of an undesired signal M_Multipath_boosting, a margin for antenna gain boosting of an undesired signal M_AntGain_boosting, a margin for excess multipath loss of a desired signal M_Excess_pathloss, a margin for airframe shadowing gain of the a desired signal M_Airframe_shadowing, an International Civil Aviation Organization (ICAO) safety margin for aeronautical communication M_ICAO_safety, and an interference margin M_interference.

7. The method of claim 2, wherein the channel assignment criterion information comprises at least one among a frequency reusable interference tolerance level, an adjacent channel available interference tolerance level, and a non-adjacent channel available interference tolerance level.

8. The method of claim 2,
    wherein the interference analysis parameter comprises at least one among existing channel information required for uplink interference calculation and existing channel information required for downlink interference calculation,
    the existing channel information required for uplink interference calculation comprises at least one among ground station 3D location information, ground station operation radius and height, ground station maximum transmit power, a ratio of ground station maximum transmit power to channel bandwidth point transmit power, air station request reception signal-to-interference-plus-noise-ratio (SINR), ground station transmit antenna gain, another channel rejection gain of an air station antenna, and an uplink channel bandwidth, and
    the existing channel information required for downlink interference calculation comprises at least one among a ground station 3D location, the ground station operation radius and height, air station maximum transmit power, a ratio of air station maximum transmit power to channel bandwidth point transmit power, ground station request reception SINR, air station transmit antenna gain, another channel rejection gain of a ground station antenna, and a downlink channel bandwidth.

9. The method of claim 2, wherein the determining of the BRLOS channel set comprises:
calculating a radio horizon distance with respect to the current communication channel and the existing communication channels;
calculating a distance between ground stations for the current communication channel and the existing communication channel and a BRLOS required distance; and
determining the current communication channel and a control and non-payload communication (CNPC) channel operable in the BRLOS environment as the BRLOS channel set.

10. The method of claim 2, wherein the calculating of the U/D value comprises: calculating interference in the existing communication channel corresponding to the RLOS channel set caused by the new communication channel; and
calculating interference in the new communication channel caused by the existing communication channel corresponding to the RLOS channel set.

11. The method of claim 3, wherein the classifying of the RLOS channel set based on the U/D value comprises: classifying existing communication channels corresponding to the RLOS channel set into one or more channel sets among a set of existing communication channels with frequency reuse possible in terms of interfering, a set of existing communication channels which are adjacent and available in terms of interfering, a set of existing communication channels which are non-adjacent and available in terms of interfering, a set of existing communication channels with frequency reuse possible in terms of being interfered, a set of existing communication channels which are adjacent and available in terms of being interfered, and a set of existing communication channels which are non-adjacent and available in terms of being interfered.

12. The method of claim 3, wherein the category determination step comprises:
determining a set of existing communication channels with frequency reuse possible as the first category;
determining a set of existing communication channels which are non-adjacent and assignable as the second category; and
determining a set of existing communication channels which are adjacent and assignable as the third category.

13. The method of claim 12, wherein a size $N\_GB(t)$ of the guard band required between the channel corresponding to the second category and the new communication channel is defined as $N\_GB(t)=\max \{N\_BW(t)+N\_BW\_new/2, N\_BW(t)/2+N\_BW\_new\}$ where $CH(t) = \{BC(N\_start(t)), \ldots, BC(N\_start(t)\pm N\_BW(t)-1)\} \in ChSET\_non-adj$, $N\_BW(t)$ is a bandwidth size of the existing communication channel corresponding to the second category, $N\_BW\_new$ is the bandwidth size of the new communication channel, and $CH(t)$ is a channel having a t-th index and consists of a set of consecutive unit channels starting from $BC(N\_start(t))$, which is a $N\_start(t)$-th unit channel, reaching $N\_BW(t)$, and $CH(t)$ is included in a channel set classified as a non-adjacent channel set.

14. The method of claim 3, wherein the UC set determined based on the U/D value comprises at least one among at least one UC that minimizes interference from the existing communication channel and at least one UC that minimizes interference in the existing communication channels.

15. A method of assigning an unmanned aerial vehicle (UAV) control channel based on an interference analysis, the method comprising:
receiving, from a user device by a central management device, a request for approval for communication with a UAV with respect to a channel selected by the user device based on the interference analysis;
analyzing, by the central management device, an interference effect on an existing communication channel with respect to the channel requested for approval; and
assigning, by the central management device, the channel requested for approval to the user device in response to a result of the analyzing of the interference effect being valid and notifying the user device that the channel requested for approval is impossible to be assigned in response to the result of the analyzing of the interference effect being invalid,
wherein in response to receiving requests to approve channels from multiple user devices, the interference effect on each requested channel is analyzed and whether to approve the channel is determined, independently, in order of the user device that makes the request first.

16. The method of claim 15, wherein the analyzing of the interference effect comprises: analyzing, by the central management device, the interference effect on the existing communication channel adjacent to the channel requested for approval, based on an interference analysis parameter and channel assignment criterion information provided to the user device and channel transmission and reception specification information of the user device.

17. The method of claim 16,
wherein the interference analysis parameter comprises at least one among existing channel information required for uplink interference calculation and existing channel information required for downlink interference calculation, the existing channel information required for uplink interference calculation comprises at least one among ground station 3D location information, ground station operation radius and height, ground station maximum transmit power, a ratio of ground station maximum transmit power to channel bandwidth point transmit power, air station request reception signal-to-interference-plus-noise-ratio (SINR), ground station transmit antenna gain, another channel rejection gain of an air station antenna, and an uplink channel bandwidth, and
the existing channel information required for downlink interference calculation comprises at least one among a ground station 3D location, ground station operation radius and height, air station maximum transmit power, a ratio of air station maximum transmit power to channel bandwidth point transmit power, ground station request reception SINR, air station transmit antenna gain, another channel rejection gain of a ground station antenna, and a downlink channel bandwidth.

18. A user device performing selection of an unmanned aerial vehicle (UAV) control channel based on an interference analysis, the user device comprising:
a transceiver;
a memory; and
a processor configured to perform interference analysis and channel selection based on a result of the interference analysis,
wherein the processor is further configured to:
transmit a request to a central management device to approve the selected channel via the transceiver; and perform communication with a UAV on the channel approved by the central management device via the transceiver, and wherein when the central management device receives requests to approve channels from multiple user devices, the interference effect on each requested channel is analyzed and whether to approve the channel is determined, independently, in order of the user device that makes the request first.

19. A central management device performing assignment of an unmanned aerial vehicle (UAV) control channel based on an interference analysis, the central management device comprising:

a transceiver;
a memory; and
a processor configured to perform channel approval comprising:
receive, from a user device, a request for approval for communication with a UAV with respect to a channel selected by the user device based on the interference analysis via the transceiver;
analyze an interference effect on an existing communication channel with respect to the channel requested for approval; and
assign the channel requested for approval to the user device when a result of the analyzing of the interference effect is valid and notify the user device that the channel required for approval is impossible to be assigned when the result of the analyzing of the interference effect is invalid, wherein when the central management device receives requests to approve channels from multiple user devices, the interference effect on each requested channel is analyzed and whether to approve the channel is determined, independently, in order of the user device that makes the request first.

* * * * *

UNITED STATES PATENT AND TRADEMARK OFFICE
CERTIFICATE OF CORRECTION

PATENT NO. : 10,880,899 B2
APPLICATION NO. : 16/248521
DATED : December 29, 2020
INVENTOR(S) : Hee Wook Kim and Kwang Jae Lim It is certified that error appears in the above-identified patent and that said Letters Patent is hereby corrected as shown below:

In the Claims

Column 32, Line 31, Claim 6 should read:
6. The method of claim 2, wherein the interference analysis parameter comprises at least one among a margin for multi path enhancement of an undesired signal M_Multipath_boosting, a margin for antenna gain boosting of an undesired signal M_AntGain_boosting, a margin for excess multipath loss of a desired signal M_Excess_pathloss, a margin for airframe shadowing gain of a desired signal M_Airframe_shadowing, an International Civil Aviation Organization (ICAO) safety margin for aeronautical communication M_ICAO_safety, and an interference margin M_Interference.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*